United States Patent [19]
Avsan et al.

[11] Patent Number: 5,933,856
[45] Date of Patent: Aug. 3, 1999

[54] SYSTEM AND METHOD FOR PROCESSING OF MEMORY DATA AND COMMUNICATION SYSTEM COMPRISING SUCH SYSTEM

[75] Inventors: Oleg Avsan; Klaus Wildling, both of Huddinge, Sweden

[73] Assignee: Telefonaktiebolaget LM Ericsson, Stockholm, Sweden

[21] Appl. No.: 08/817,508

[22] PCT Filed: Oct. 17, 1995

[86] PCT No.: PCT/SE95/01215

§ 371 Date: Jul. 9, 1997

§ 102(e) Date: Jul. 9, 1997

[87] PCT Pub. No.: WO96/12230

PCT Pub. Date: Apr. 25, 1996

[30] Foreign Application Priority Data

Oct. 17, 1994 [SE] Sweden .................................. 9403531

[51] Int. Cl.[6] .................................................. G06F 15/00
[52] U.S. Cl. .......................... 711/202; 711/158; 711/159
[58] Field of Search ..................................... 711/202, 207, 711/5, 205, 117, 121, 118, 155, 150, 3, 206; 365/189.05, 230.03

[56] References Cited

U.S. PATENT DOCUMENTS

| | | | |
|---|---|---|---|
| 4,920,477 | 4/1990 | Colwell et al. | 711/207 |
| 4,922,415 | 5/1990 | Hemdal | 711/206 |
| 5,214,777 | 5/1993 | Curry, Jr. | 711/155 |
| 5,247,645 | 9/1993 | Mirza et al. | 711/5 |
| 5,301,287 | 4/1994 | Herrell et al. | 711/202 |
| 5,361,340 | 11/1994 | Kelly et al. | 711/3 |
| 5,623,626 | 4/1997 | Morioka et al. | 711/118 |
| 5,680,577 | 10/1997 | Aden et al. | 711/150 |
| 5,729,711 | 3/1998 | Okamoto | 711/205 |

Primary Examiner—John W. Cabeca
Assistant Examiner—Fred F. Tzeng
Attorney, Agent, or Firm—Burns, Doane, Swecker & Mathis, L.L.P.

[57] ABSTRACT

The present invention relates to a system for processing of memory data in the form of stored variables. The system comprises at least one data execution unit (IPU), a common data memory (DS), a central processor bus and a function unit (30) for autonomous handling of variables. Each variable has a logical address or a base address and the function unit (30) comprises means for converting logical addresses to physical addresses. The function unit further comprises first memory means (1) for storing calculated physical memory addresses and second memory means for temporary storing of the last calculated address temporarily and in sequence. In the function unit (30), a comparing arrangement (JMF) is arranged for comparing the addresses of incoming memory requests with physical word addresses for particularly the last requested memory address (A4). When the addresses are the same (A3–A4), memory data of the first requested memory address is reused.

18 Claims, 1 Drawing Sheet

SYSTEM AND METHOD FOR PROCESSING OF MEMORY DATA AND COMMUNICATION SYSTEM COMPRISING SUCH SYSTEM

TECHNICAL FIELD

The present invention relates to a system and a method respectively for processing of memory data. The invention also relates to a communications system comprising such a system for processing of memory data.

Memory communication for stored data variables within a data processing system often consumes a great part of the capacity that is available within the data communication unit for intercommunication between the location for storing the variables and the unit for data processing.

It is common that a number of variables share the memory area of a word. Variables sharing the memory area of a word is efficient from a memory packing point of view. Among others such sharing may contribute in reducing the number of memory accesses. In spite thereof, however, the available capacity is sometimes not used in an efficient way.

For example in large systems processing data in real time which require very much memory it is particularly important to have an organisation of the memory so that a high storing and communication capacity can be provided.

STATE OF ART

Many different alternatives have been suggested for how to, in an efficient way, use the capacity for storing and communication between the location for storing of variables and that or those units which are to process data. It is a problem that the memories are comparatively slow as compared to the data processing units from an internal point of view. With the known solutions to these problems it has been intended to achieve an efficient usage of memory accesses.

In U.S. Pat. No. 4,354,231 cache-technique is used. The cache-technique is based on storing memory data that is often addressed in a fast memory, a so called cache-memory which is controlled by various algorithms. Therefor memory operations directed towards a slow memory are often handled by the cache-memory which has an access time which is considerably shorter. According to U.S. Pat. No. 4,354,231 an address calculation is initiated in good time before the relevant program instructions are to be executed in order to reduce the waiting time. The arrangement according to the above mentioned US-document for reducing the time for instruction execution comprises a buffer memory in which instructions read from the program memory are sequentially and temporarily stored in an execution buffer. The execution buffer is provided with instructions of different kinds, of which a first kind relates to writing or reading in the data memory and a second kind of instructions places address parameters in a register memory. First and second activation means which are intended for initiation-transfer of address parameters from the register memory to the address processing means for modifying the address when an indication is present in a registering means and the instruction is in turn to be handled and is of the above mentioned first kind, or for removing the indication from the registration means after the transmission has been effected and the second activation means which are connected to the address handling means, respectively respond to a base address read out from a reference memory to the address handling means for initiation of a calculation of the absolute address when at the same time none of the ahead stored instructions are of the second kind, i.e. the kind which places the address parameters in the register memory etc. Thus a certain time saving is provided thereby through an efficient usage of the time. However, except for the time savings, which even may be minor, memory data of a system can be localized in such a way that the application of the cache-technique indeed does not give the desired result and may in fact be inefficient.

Furthermore, the cache-technique is not efficient for randomly occurring data accesses.

EP-A-0 439 025 discloses a data processor having a deferred cache load which comprises an instruction prefetch unit, a memory, a processor bus and a function unit wherein the latter converts logical addresses and provides for storing of preceding memory accesses in a cache memory and for storing of incoming memory requests. Furthermore a comparison of addresses is done and if there is correspondence, memory data of a preceding request is reused.

However, the system according to EP-A-0 439 025 presupposes pre-buffering or prefetching which sometimes is inconvenient. Furthermore, it is a precondition that data arrive is regularly, i.e. that data are not spread out. Furthermore an intermediate buffer is required. Consequently the system is complicated and it cannot be used for randomly occurring data etc. which both are serious drawbacks.

Other known ways through which it is an intended to obtain an efficient usage of accesses and to provide a high capacity are based on an interleaving organization. The memory is organized in a number of memory banks and in practice it behaves like a fast memory. On condition that consecutive memory accesses are directed towards different memory banks, interleaving technique may in some cases provide comparatively good results.

However, in many cases it is desirable to further reduce the memory accesses. Furthermore the interleaving technique is efficient only on condition that consecutive memory accesses are not directed towards the same memory bank. For consecutive memory accesses addressing one and the same memory word, the efficiency can not be improved by known methods.

SUMMARY OF THE INVENTION

It is an object of the present invention to provide a system and a method respectively for processing of memory data wherein the data processing capacity is used as efficiently as possible. Particularly it is an object of the invention to provide a system having such a memory organization that efficient storing as well as efficient communication between storing location and data processing units can be provided. It is particularly an object of the invention to provide a system and method wherein memory accesses can be used as efficiently as possible. Furthermore it is an object of the invention to provide a system and a method respectively wherein the number of memory accesses can be reduced. Furthermore it is a particular object of the invention to provide a system and a method that reduces the number of accesses in connection with processing of indexed variables and/or partial variables and sub-data variables.

A particular object of the invention is to provide a system and a method respectively through which a considerable increase in capacity can be provided, particularly independently of which memory organization that is used. More particularly it is an object of the invention to provide a system which uses interleaving and more particularly data (pre)buffering which from a capacity point of view is highly efficient.

A further object of the invention is to provide a system in which index addressed variables of varying format size and in which the number of memory accesses is reduced in relation to the actual number of memory accesses.

Furthermore it is a particular object of the invention to provide a system and a method respectively with a number parallel requesting sources in which an efficient usage of memory accesses is provided.

Still a further object of the invention is to provide a communications system comprising a system for processing of memory data as referred to above which efficiently uses the capacity and which in an optimal way uses memory accesses.

A particular object is to provide a system (and a method) which can be used when variables are spread across the memory, data may arrive randomly. Most particularly to provide such a system when a normal cache cannot be used because of said irregularities.

Moreover it is a particular object to provide a system which can be used and which is efficient when the variables are not regularly returned to and when variables are located over an address area which substantially is not limited.

These as well as other objects are achieved through a system and a method respectively in which directly or indirectly consecutive requests towards the same physical word address for variables, the memory is only activated for the first memory access on the actual word address, the memory data or read data of which thus is multiple-used. Thus the objects are achieved through memory accesses having the same word address as a preceding—particularly the preceding—access, use memory data, particularly read data, on the previous access. Thus a memory access is saved. According to advantageous embodiments the variables are indexed variables, partial variables or sub-variables.

According to a particularly advantageous embodiment the memory system uses an interleaving technique and particularly advantageously with data (pre)buffering or prefetching. Particularly buffering in this case means that address calculations and memory requests for reading of variables from the memory take place in advance and are transferred to the data processing unit before data is required by its program steps. This provides a considerable increase in capacity. Particularly data is sent directly to the operating register without requiring any intermediate buffer.

According to an advantageous embodiment of the invention, independently of which variable that is intended in the read out memory word, an address information part is obtained at every request when a physical memory address relating to a logical address is represented to the variable in a known way.

According to a particular embodiment the invention intends to provide a reduction of consecutive read accesses directed towards the same word address in the memory.

More particularly, according to an advantageous embodiment, consecutive write accesses to variables with the same physical word address are reduced.

According to an advantageous embodiment, for consecutive write requests of variables having the same physical word address, the read data of a first access is handled essentially in the same way as in a conventional read access corresponding to the memory access of the write operation for read-out whereas the second memory access of the write operation which comprises writing in the memory, is such that a consecutive write request receives the write data of the preceding access as its own read data. According to one embodiment memory activities for writing are executed for each variable. According to an alternate embodiment memory activities for writing are executed when a complete variable word has been processed. Then it is an advantage if the actual memory address is protected against interference until all variables of the word are processed and the result has been executed in the memory.

According to an advantageous embodiment index addressed variables of varying format are used in the data processing system. In a particular embodiment there are a number of parallel request sources. The system can thus be used in parallel for more than one data processing unit. This can be said to give rise to gain in capacity in an indirect way since the various parallel requesting sources or the data processing units are exposed to fewer access obstacles when the common memory is requested.

In addition to other advantages as referred to in advantageous embodiments etc. it is an advantage of the invention that it is not necessary to update several means.

BRIEF DESCRIPTION OF THE DRAWINGS

The invention will in the following be further described in a non-limiting way under reference to the accompanying drawings in which.

DETAILED DESCRIPTION OF THE INVENTION

Figure 1:
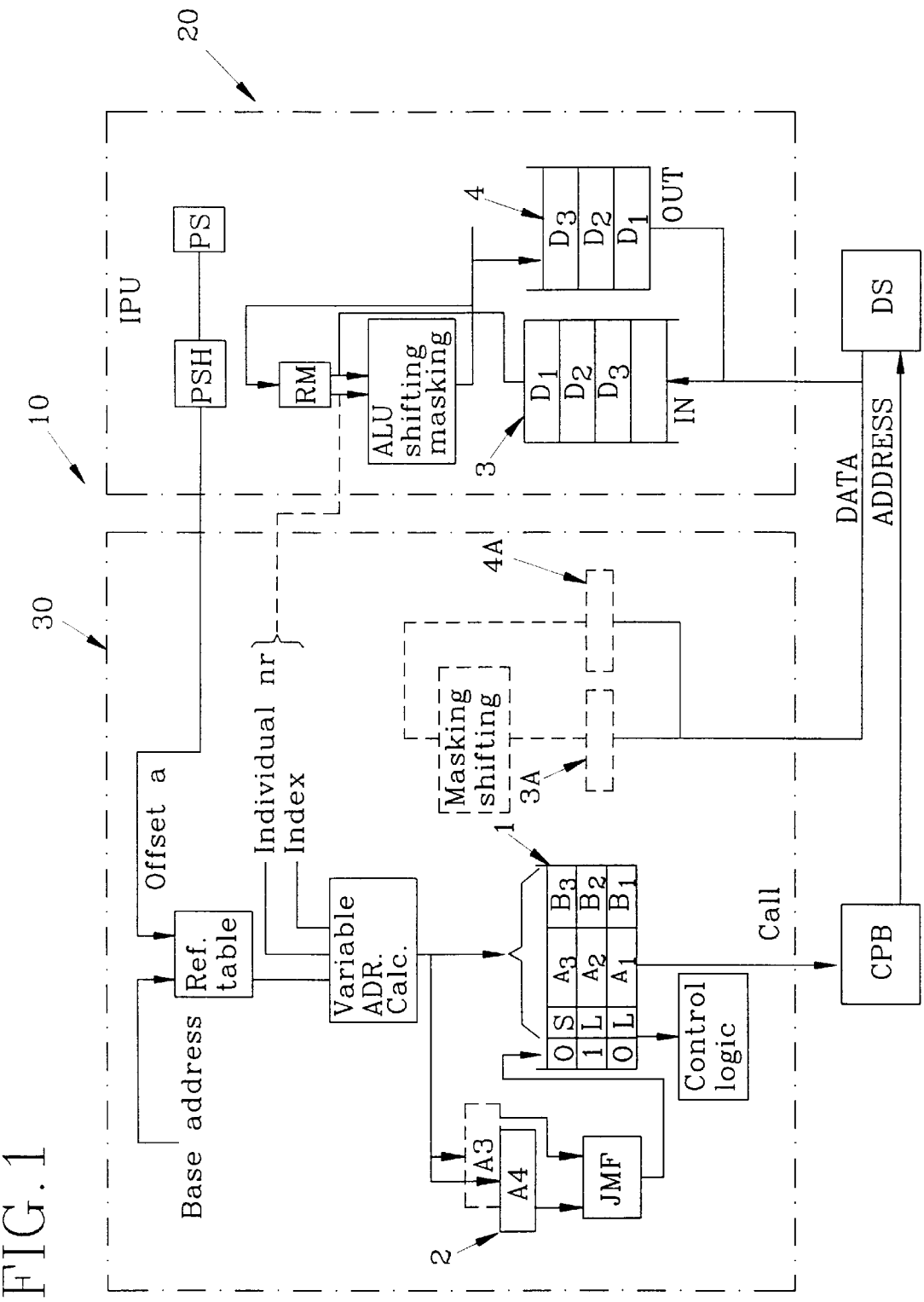
FIG. 1 illustrates an example of a system according to the invention.

FIG. 1 illustrates a data processing system 10 which comprises at least one data processing unit IPU 20. In the shown embodiment there is only one data processing unit but there could as well be two or more. The data processing unit IPU comprises internal process registers and arithmetical and logical units ALU intended for data processing. The data processing unit IPU further comprises a program memory handler PSH, a program memory PS and a register memory RM. The data processing system 10 comprises a common data memory DS. An asynchronous cooperation between the data processing unit IPU and the memory DS is according to an advantageous embodiment controlled by a synchronization bit. The common data memory DS for stored variables is according to an advantageous embodiment formed by memory banks through the use of the so called interleaving technique. A centrally controlled bus and access handler (central processor bus) CPB carries out the memory request. The central processor bus CPB controls and keeps information about which memory banks of the data memory DS which are free and occupied respectively. Furthermore the central processor bus is aware of the sequential order at activation of various memory operations. The data processing system further comprises a function unit 30 for autonomous handling of variables. In the function unit 30 are reference tables and address calculation circuits for conversion of logical addresses to physical addresses. Furthermore the function unit 30 comprises logical circuits, buffer registers etc. A buffer register 1 is arranged for the physical memory addresses which are calculated with the assistance of reference tables and address calculation circuits. For each requested variable information about memory word address $B_1,B_2,B_3$, variable address $A_1,A_2,A_3$ as well as the format within the memory word is stored. Furthermore information is stored about the operation type of the requested variable, i.e. normally read or write type, according S,L,L wherein S denotes writing and L reading. Furthermore a state bit is stored in the buffer register 1. According to an advantageous embodiment the buffer memory 1 comprises a so called FIFO-memory (first in/first out). The last calculated address is then stored in an intermediate buffer 2 as A4. Through comparison means comprising a comparison circuit JMF, the new, i.e. the last calculated address A4 in the intermediate buffer is compared to the preceding address A3 in the buffer register 1. If the addresses are the same (A3=A4), the mark bit which may be 0 or 1, is set.

The system 10 further advantageously comprises a second buffer register 3 which also may be of FIFO-type. This serves as a register for the variables which have been read out and which may take the function of an operand register for the data processing unit IPU. For an extended parallel operation the system may advantageously comprise a second intermediate register 3A for preparing variables for example relating to the shifting and masking of the variable within the read memory word.

A third buffer register 4 may further be arranged which also may be of FIFO-type register for variables which are to be stored in the data memory DS. According to a particular embodiment may a furthermore a third intermediate register 4A be arranged which among others can be used for further increasing the efficiency for certain operations etc.

According to an advantageous embodiment the system operates as follows. The program store handler PSH in the data processing unit IPU activates, advantageously in advance with (pre)buffering, a variable request per program step through giving its logical address. This is given through offset a, individual number and index and furthermore the kind of operation, particularly read or write (L or S). Then the address calculation is activated via control logic. This converts the logical address of the variable to the corresponding physical address with use of a reference table which contains information needed for providing the conversion. Before a variable address calculated in this way is placed in the buffer register 1 for processing, the memory word address part is compared to the memory address of the preceding variable in the buffer register 1. This comparison is done in the comparison arrangement JMF which comprises comparison circuits. If the last calculated variable address A4 is equal to the preceding variable address A3 of the buffer register, a mark bit is set which indicates that the new data variable disposes the same memory word as the preceding variable. When a buffered request towards a memory is processed via the central processor bus the flag bit reroutes the request. This results in a memory access or, if two consecutive memory addresses are the same, it results in reuse of the read data for the preceding memory access. When the read data of the preceding memory access is reused, the read data is already present in the indata buffer of the data processing unit IPU. If there is an intermediate register 3A in the function unit 30, data is transferred from this intermediate register to the indata buffer 3 of the data processing, unit IPU.

In the following a case relating to consecutive write requests will be briefly discussed. A write operation as such comprises two memory accesses, one for read out and one for write in. In the case of consecutive write requests to data variables having the same physical word address, reading means that the read data of the first request is handled in a way which corresponds to that of the read request whereas the following write request receives data from the preceding access as its own read data. This means that the write data of the preceding variable which is in the data buffer in IPU, is transferred to the indata buffer 3 of the data processing unit IPU. If intermediate registers 3A;4A are used, data is according to one embodiment transferred from the intermediate register to the indata buffer 3 of the unit IPU for processing. Consequently the mark bit in combination with the actual type of operation, i.e. reading or writing, control the memory activation as well as internal data transfers between buffers as well as within the buffer register 1. The parts of the buffer register 1 which are required for variable handling are transferred to the buffer of the data processing unit IPU.

The invention shall of course not be limited to the embodiments shown herein but, as mentioned above, a plurality of data processing units may work in parallel as well as there are a number of other alternatives. Furthermore the variable requests do not have to be directly consecutive but according to an alternative there may be one or more variable requests in between in a predetermined manner.

We claim:

1. A system for processing of memory data in the form of stored data variables, comprising:
   at least one date processing unit (IPU);
   a common data memory (DS) for storing data variables, wherein each data variable has a logical address associated therewith;
   a central processor bus (CPB);
   a function unit for converting logical addresses of the data variables to corresponding physical addresses; said function unit including;
   a first memory means having FIFO register for storing physical addresses corresponding to logical addresses of data variables associated with incoming memeory requests;
   a second memory means for temporary and sequential storing at least one physical address for an incoming memory request; and
   means for comparing the at least one physical address of the incoming memory request with a physical address of a preceding memory request in the FIFO register to determine whether the compared physical addresses are the same, wherein variable data associated with the preceding memory request is used also for the incoming memory request, if the compared physical addresses are the same.

2. A system according to claim 1, wherein the common data memory (DS) comprises memory banks arranged according to an interleaving technique.

3. A system according to claim 1, wherein more than one physical addresses are stored in the FIFO-register.

4. A system according to claim 3, wherein the more than one physical addresses are processed to provide a requested data variable to a data processor unit before the requested data variable is required.

5. A system according to claim 1, wherein the function unit uses reference tables and address calculation circuits for converting the logical addresses to the physical addresses.

6. A system according to claim 5, wherein the FIFO register also stores corresponding word addresses of the stored physical addresses.

7. A system according to claim 6, wherein the FIFO register stores information about operation type of the memory requets.

8. A system according to claim 1, wherein the second memory means comprises an intermediate register for storing the physical address associated with the incoming memory request.

9. A system according to claim 8 further including a third buffer register for data variables which are to be stored in the common data memory (DS).

10. A system according to claim 1, wherein if the compared physical addresses are the same, a mark bit is set in the FIFO register for indicating such condition.

11. A system according to claim 1 further including two or more data processing units (IPU) which can operate parallelly within the system.

12. A system according to claim 10, wherein the function unit furthermore comprises a second intermediate register for providing data variables for the two or more data processing units (IPU).

13. A system according to claim 12, wherein the second buffer register comprises a FIFO-memory.

14. A system according to claim 1 further including a second buffer register for storing information about read-out variables.

15. A system according to claim 1, wherein for consecutive memory requests to the same physical address in the data memory (DS), the read data for the consecutive memory requests are used.

16. A system according to claim 1, wherein a write request comprises a memory access for read out and a memory access for write in and, wherein for consecutive write requests to data variables, write requests following on a first access use the write data of the first access as read data for the following access.

17. A method for accessing data comprising the steps of:
receiving memory requests for data variables from a common data memory (DS), wherein each data variable has a logical address associated therewith;
converting the logical addresses of the data variables to corresponding physical addresses of the common data memory (DS);
storing at least one of the physical address corresponding to a logical address of a data variable associated with an executed memory requests in a first register;
storing at least one physical address associated with an incoming memory request in a second register;
comparing the at least one physical address of the incoming memory request in the second register with the at least one physical address of the executed memory request in the first register;
determining whether the compared physical addresses are the same; and
using data variable associated with the executed memory request for the incoming memory request, if the compared physical addresses are the same.

18. An apparatus for accessing data comprising:
a data processing unit that generates memory requests for data variables from a common data memory (DS), wherein each data variable has a logical address associated therewith;
a data converter that converts the logical addresses of the data variables to corresponding physical addresses of the common data memory (DS);
a first register that stores at least one of the physical address corresponding to a logical addresses of a data variable associated with an executed memory requests;
a second register that stores at least one physical address associated with an incoming memory request;
a function unit that compares the at least one physical address of the incoming memory request in the second register with the at least one physical address of the executed memory request in the first register for determining whether the compared physical addresses are the same and uses data variable associated with the executed memory request for the incoming memory request, if the compared physical addresses are the same.

* * * * *